United States Patent [19]

Le et al.

[11] Patent Number: 4,468,039
[45] Date of Patent: Aug. 28, 1984

[54] PACKING RING CARTRIDGE WITH ADJUSTING SCREWS

[75] Inventors: Tri C. Le, Missouri City; Danny S. Meyer, Richmond; John B. Williams, Houston, all of Tex.

[73] Assignee: ACF Industries, Incorporated, New York, N.Y.

[21] Appl. No.: 557,802

[22] Filed: Dec. 5, 1983

[51] Int. Cl.³ .............................................. F16J 15/12
[52] U.S. Cl. ..................................... 277/112; 277/12; 277/188 R; 251/214
[58] Field of Search .................... 277/12, 32, 110–112, 277/188 R, 188 A; 251/214

[56] References Cited

U.S. PATENT DOCUMENTS

| | | | |
|---|---|---|---|
| 3,259,358 | 7/1966 | Tripoli | 251/214 |
| 4,262,690 | 4/1981 | Binegar | 251/214 X |
| 4,379,557 | 4/1983 | Saka | 251/214 X |
| 4,384,726 | 5/1983 | Meyer | 277/112 X |

FOREIGN PATENT DOCUMENTS

| | | | |
|---|---|---|---|
| 60238 | 9/1982 | European Pat. Off. | 251/214 |
| 828652 | 2/1960 | United Kingdom | 251/214 |

*Primary Examiner*—Robert S. Ward
*Attorney, Agent, or Firm*—Marvin J. Marnock

[57] ABSTRACT

A pressure energizable packing assembly (47) for sealing the stem and valve body of a high pressure valve. The assembly comprises one or more sets (60, 61) of packing rings (62) which are adapted to be compressed between a pair of retainer rings (64, 65) and radially expanded into sealing engagement with the valve stem (45) and valve body (11). The retainer rings are actuated by Belleville springs (70) in a preloaded condition of the assembly and additionally by fluid pressure in the valve body after installation. The packing assembly includes an adapter ring plug (71) for accommodating its connection in the valve body. The packing assembly is assembled as a cartridge and held together by screws (77) which extend through the adapter ring (71), the outer retainer ring (64), the packing ring sets (60, 61) and their separating spacer ring (63), and which are anchored in the inner retainer ring (65). The screws can be adjustably tightened to place the cartridge in a desired preloaded condition after installation in a packing chamber (46a, 46b). The packing assembly is adapted for use as a cartridge in packing chambers without concern for the effect of tolerance "stack-up" in the axial dimension and without adjustment in the number of Belleville springs.

6 Claims, 2 Drawing Figures

PACKING RING CARTRIDGE WITH ADJUSTING SCREWS

BACKGROUND OF THE INVENTION

This invention relates to high pressure packings and more particularly to a packing assembly for use as a shaft seal such as the seal between the stem and bonnet of a gate valve.

The various types of packing materials and valve stem packing arrangements that have been proposed or used in the past for high pressure applications or applications where the valve is subjected to handling wide pressure variations or harmful noxious or toxic substances such as hydrogen sulfide have not been entirely satisfactory. In assembly of the valves, it is frequently important that the packings be placed in a preloaded condition prior to use in order that a seal can be established at low fluid pressures as the pressure builds. This has heretofore been very difficult to achieve, and installation and removal of such packings have been difficult. Tolerance stack-up has presented a problem with packings of the type which use spring washers for preloading since a varying number of such springs must be employed with different valves or valve bodies due to manufacturing variances. The determination of the proper number of such springs is tedious and time consuming when done by field personnel in repairing and replacing packings and can lead to hazardous errors. Also, such non-uniformity obviously adds to the manufacturing costs. Furthermore, replacement of such packings is not always easy and it is also very difficult, it not impossible, to adjust or readjust the preloading of the packing assembly when the valve is in service.

It is, therefore, an object of the invention to provide a pressure energizable packing assembly for sealing the stem and bonnet of a high pressure gate valve and which can be manufactured and assembled economically as a cartridge.

Another object is to provide a packing assembly for effecting a shaft seal between a shaft and the wall of a bore which receives the shaft therethrough wherein the packing assembly is provided with annular packing elements and a fixed limited number of annular springs for applying an axial loading to the packing elements, the packing assembly being adapted for use in packing chambers having considerable variation in axial dimensions as results from stacking of tolerances.

Still another object is to provide a packing assembly for effecting a seal between the valve stem and bonnet of a gate valve which can be installed and placed in a preloaded condition and is provided with means for easily adjusting the preloading condition of the packing assembly without requiring the removal of the packing assembly while the valve is in operation.

A further object is to provide a pressure energizable packing assembly for sealing the stem and bonnet of a high pressure gate valve wherein the assembly comprises redundant sets of packing rings arranged in a cartridge wherein fluid pressure in the valve body is amplified in transmission to the packing rings even though there is a sealing failure of one set of packing rings.

A still further object is to provide an improved packing assembly for sealing between the valve stem and body of a high pressure valve and which can be easily adjusted or replaced in the field by service personnel.

SUMMARY OF THE INVENTION

The invention is a (pressure energizable) packing assembly for sealing the valve stem 45 and bonnet 22 of a gate valve 10 used to handle high pressure fluids. The packing assembly includes one or more sets 60, 61 of packing rings separated by a spacer ring 63 and sandwiched between a pair of hard metal retainer rings 64, 65. The assembly includes a threaded packing gland adapter plug 71 for accommodating its installation in a valve body 11 and a fixed number of annular Belleville springs 70 which are compressible between the adapter plug 71 and the outer retainer ring 64 to impose an axial loading on the assembly. The packing assembly is assembled as a cartridge and held together by screws 77 which extend through the adapter plug 71, the outer retainer ring 64, the packing rings 62 and spacer ring 63 separating the packing ring sets 60,61 and which are anchored in the inner retainer ring 65. The screws 77 can be adjustably tightened to place the cartridge in a desired preloaded condition after installation wherein the packing rings are axially compressed between the retainer rings and radially expanded into sealing engagement with the stem 45 and bonnet 22. The packing rings are further energized by fluid pressure in the valve body which is amplified as a compressive force for energizing the packing rings. The packing assembly can be installed and used as a cartridge in packing chambers without concern for the effects of tolerance "stack-up" in the axial dimension and without adjustment in the numer of Belleville springs.

DESCRIPTION OF A PREFERRED EMBODIMENT

Figure 1:
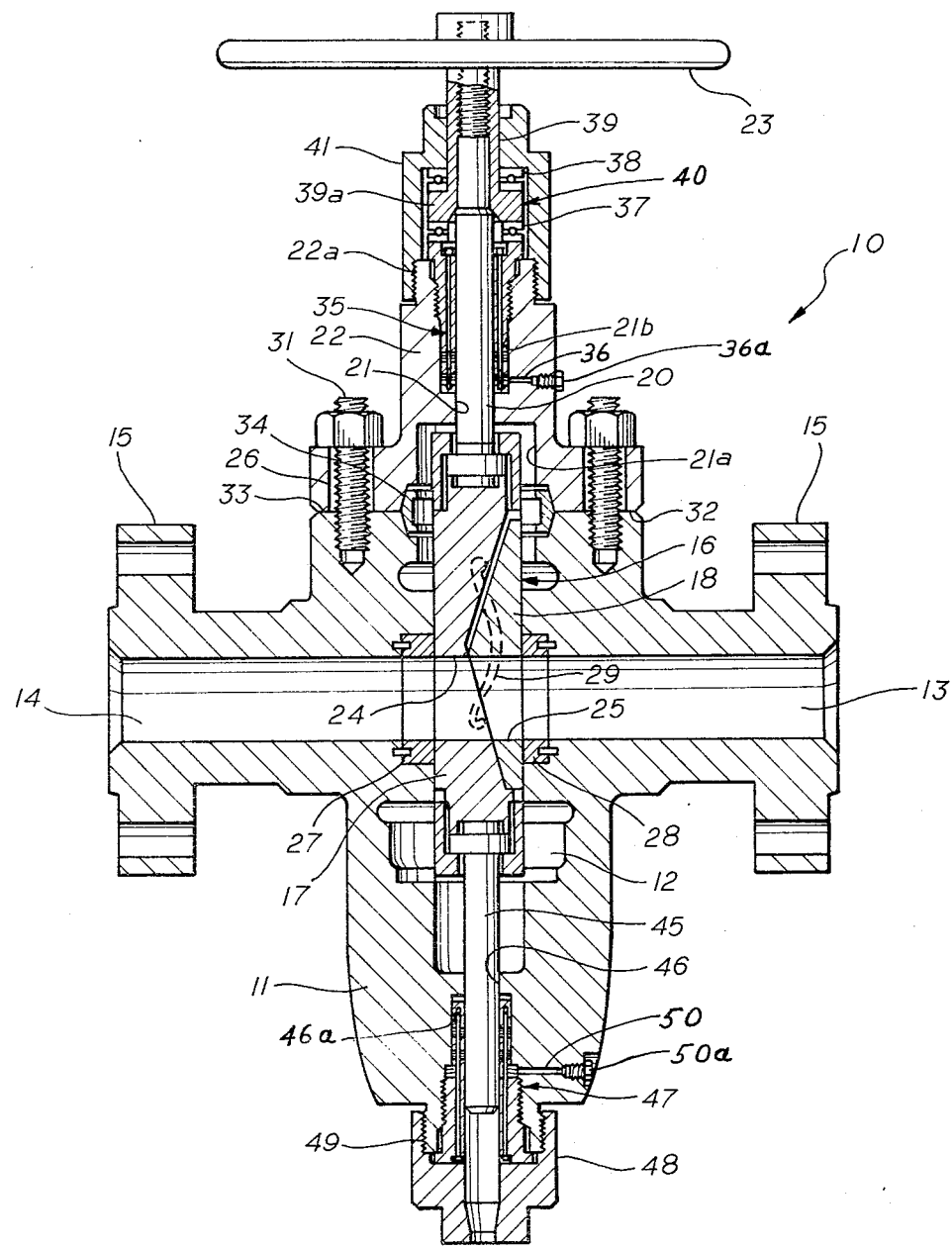
FIG. 1 is a sectional view of a high pressure balanced stem gate valve which is provided with a pair of stem packing assemblies constructed in accordance with a preferred embodiment of the invention.

Referring to the drawings in greater detail, the invention is illustrated herein in connection with a gate valve 10 which is designed for high pressure critical service and is of the type which utilizes the principle of parallel expanding gates for obtaining a positive mechanical seal on the upstream and downstream sides of the gate assembly. The valve 10 in FIG. 1 which illustrates a typical application of the high pressure packing assembly of this invention includes a valve body 11 provided with a valve chamber 12 and inlet and outlet flow passages 13 and 14 which are in fluid communication with the valve chamber 12 to form a flow way through the valve. Flanges 15 at the ends of the valve body provide means for connecting the valve in a flowline.

With the valve chamber 11 a gate assembly 16 is mounted for sliding movement transversely of the flow passages to open or close the flow way. The gate assembly 16 comprises a gate member 17 and a segment 18. The gate member 17 is connected at its upper end to a valve stem 20 which extends through an axial bore 21 of the valve bonnet 22 which is bolted atop the valve body 11 and closes the upper end of the valve chamber 12. At its upper end the stem 20 is provided with a valve actuating handwheel 23. The valve shown is of the rising stem type and the stem 20 is connected to the gate member 17 so that upon rotation of the handwheel and the stem, the gate assembly is prevented from axial rotation but is movable across the flow way to open or close the valve. In the valve open position, ports 24, 25 in the gate and segment members, respectively, are aligned in registry with the inlet and outlet passages 14 and 13.

As is typical of expansible gate assemblies, the gate member 17 is provided with a V-shaped recess which accommodates the wedge shaped segment 18, the wedge faces of which conform to the surfaces of the V-shaped recess and are in contact therewith. Also, characteristically, the linear movement of the gate assembly to open or close the valve causes an expansion of the gate assembly in both its open and closed positions due to relative sliding movement between the gate and segment members 17 and 18 as induced by suitable stops (not shown) in the valve chamber 12 for limiting the vertical movement of the segment 18 relative to the gate 17. When in expanded condition, the gate assembly seals against rings 27 and 28 mounted in annular recesses which surround the flow passages 14 and 13, respectively, and open to the valve chamber 12. The gate assembly 16 is also provided with a biasing means such as a pair of bow springs 29 which are fixed to the sides of the gate assembly and bias the gate assembly towards a collapsed condition wherein the segment member 18 is nested in the V-shaped recess of the gate member 17. Accordingly, when in transit between the open and closed positions the gate assembly 16 is in collapsed contracted condition and the valve chamber 12 is exposed to the flowline pressure.

It is also seen that the bonnet 22 is secured to the valve body by a plurality of studs 31 which pass through a radial flange 26 on the lower end of the bonnet. The flat end surface 32 of the bonnet is superimposed against the flat annular surface 33 of the valve body when the bonnet is in bolted engagement atop the valve body 11, and a metal sealing ring 34 such as disclosed in U.S. Pat. No. 4,408,777, is installed in annular recesses provided at the joint between the bonnet 22 and the valve body 11 to effect a fluid-tight seal under all pressure conditions.

A central axial bore 21 which extends through the bonnet 22 receives the valve stem 20 and is enlarged at the lower end of the bonnet to provide a bore enlargement 21a which forms an extension of the valve chamber 12 for accommodating the gate assembly 16. The bonnet bore 21 is also provided with an enlargement 21b at the upper end of the bonnet for accommodating the packing assembly 35 of this invention to be described hereinafter in greater detail. A lubricant injection passage 36 which is provided through the wall of the bonnet 22 and opens to the stem bore 21 permits lubricant injection into the bore 21 if so desired. The injection passage is normally sealed by a plug 36a.

Atop the bonnet 22 and the packing assembly 35, there is supported a roller bearing assembly 40 comprising bearings 37, 38. The roller bearing assembly 40 also includes a sleeve element 39 which is threaded onto the top end of the stem 20 and disposed in sleeved relation about the stem. The sleeve 39 at its lower end includes an annular flange 39a which is disposed between the bearings 37, 38. The upper bearing 38 is supported on the upper annular surface of the flange 39a and the lower surface of the flange 39a rests atop the bearing 37 which in turn, is disposed atop the packing assembly 35. A tubular bearing housing 41 which is threadedly secured to an upstanding neck portion 22a of the bonnet 22 at its upper end includes a reduced bore section which receives the sleeve element 39 therethrough. The remainder of the bore of the bearing housing is relatively enlarged to receive the bearings 37, 38 which are enclosed and retained by the bearing housing.

The gate valve 10 is a balanced stem valve including a lower valve stem 45 which is connected to the lower end of the gate member 17 in coaxial alignment with the upper stem 20. The lower stem 45 extends through a bore 46 provided in the lower end of the valve body 11. A packing assembly 47 indentical to that of the packing assembly 35 is received in successive counterbore enlargements 46a, 46b, 46c of the bore 46 for axial reciprocative movement therein and provides a fluid-tight seal between the lower stem 45 and the valve body 11. A packing retainer cap 48 is threaded onto an extension 49 of the valve body 11 at its lower end and securely retains the packing assembly 47 in the bore 46. A lubricant injection passage 50, which is formed in the valve body 11, opens to the stem bore 46 and permits lubricant injection thereto as may be desired. The passage is normally sealed by a plug 50a.

Since the two packing assemblies 35 and 47 and their integration with the valve 10 are substantially identical, only one packing assembly will be described in detail. Accordingly, referring more particularly to FIG. 2, which shows the lower packing assembly 47, it will be seen that the bore section 46c opens at the lower end of the valve body 11 and terminates at its "inner" end in a frusto-conical shoulder 51 which adjoins the bore section 46b of slightly smaller diameter. As used herein, the term "inner" applies to an element near the flow passage through the valve and "outer" applies to an element more remote therefrom. It is also seen the bore section 46b terminates at its inner end in an annular shoulder 52 which adjoins the bore section 46a. The bore section 46a is of smaller diameter than the bore section 46b and terminates at its inner end in a flat annular shoulder 53. The bore section 46b has a smooth bore wall in a portion thereof which is adjacent to and adjoins the shoulder 52 and a threaded portion throughout the remainder thereof which is of greater axial dimension.

Packing assembly 47 includes first and second sets 60, 61 of packing rings 62 which are separated by a metal spacer ring 63. In each set, the packing rings are arranged against one another in a stack about the stem 45. The outer set 61 of packing rings are sandwiched between the spacer ring 63 and a hard metal outer retainer ring 64. The inner set 60 of packing rings is sandwiched between the spacer ring 63 and a hard metal inner retainer ring 65. The outer retainer ring 64 at its inner end is provided with an external diameter conforming to that of bore section 46a but sized so as to be snugly receivable therein. The remainder of the ring is of a reduced external diameter which with the smooth wall portion of the bore section 46b forms an annular chamber for accommodating a plurality of stacked frusto-conical spring washers or Belleville springs 70.

The packing rings are preferably a polymeric substance such as polytetrofluoroethylene, polyimide, polyphenylene sulfide, perfluoroalkoxy or other similar plastic material. Such plastic materials have desirable sealing properties and are able to intimately contact the metal stem 45 and the valve body 11 even though there has been galling of the stem or other surface damage. It is to be understood, however, that other suitable resilient or elastomeric materials could be used to form the packing rings.

The packing assembly 47 which includes the two sets 60, 61 of packing rings, spacer 63, and retainer rings 64, 65 is held in place when installed in the bore section 46a by a packing gland adapter plug 71. The adapter plug 71 includes an externally threaded inner end portion 71a which is adapted to be threadedly received in the bore section 46b in the valve body and is provided with an axial bore extending through the plug body for receiving the lower valve stem 45. The plug 71 is further provided with an external frusto-conical shoulder 75 of a taper and configuration conforming to that of the frusto-conical shoulder 51 between the bore sections 46b and 46c. The plug shoulder 75 joins the threaded inner end portion 71a of the plug with an enlarged diameter smooth walled portion 71b intermediate the threaded portion and the flanged outer end of the plug.

Figure 2:
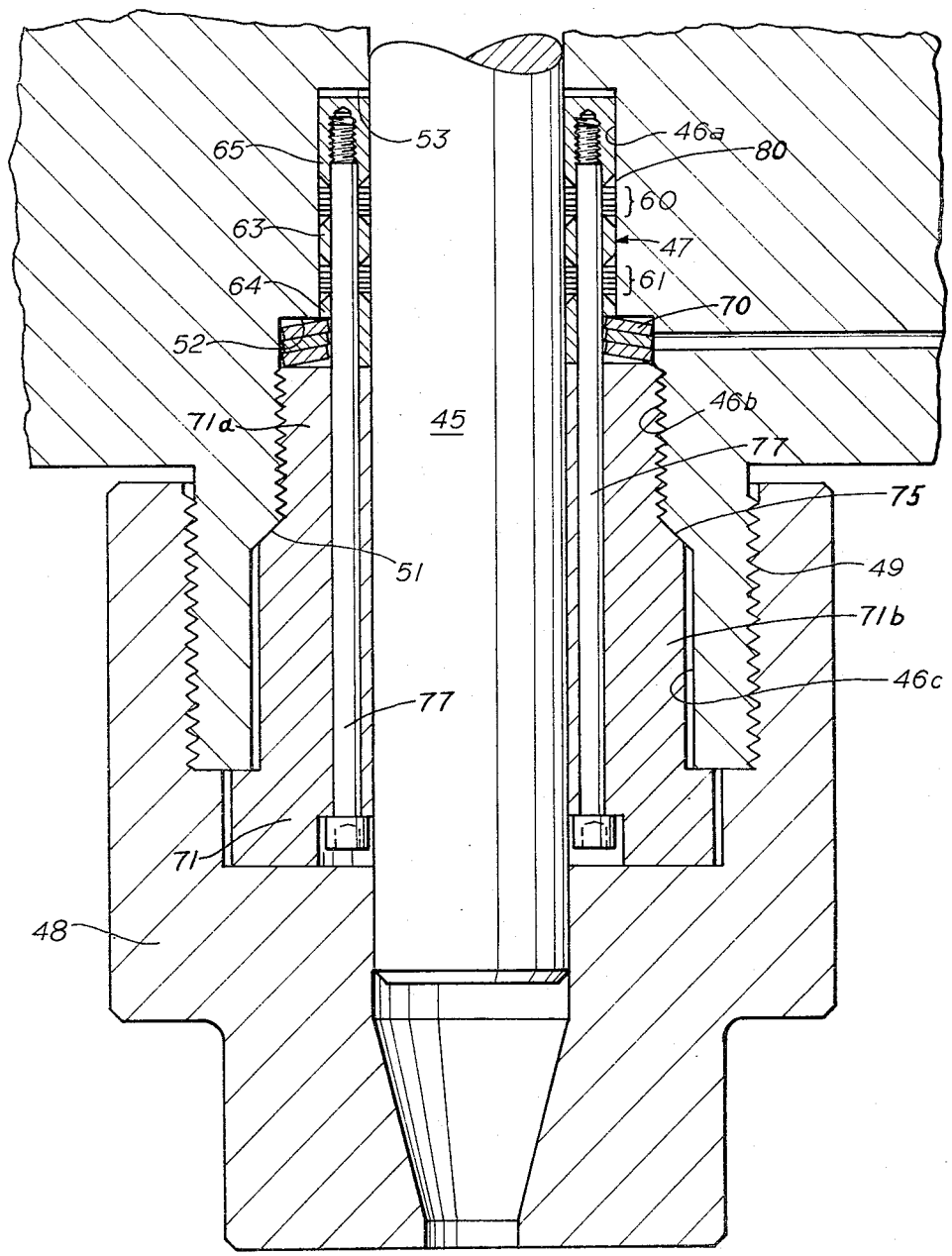
FIG. 2 is a fragmentary sectional view on an enlarged scale of the lower end of the valve of FIG. 1 and showing details of the packing assembly of this invention.

With continued reference to FIG. 2 in particular, it will be seen that the packing assembly including the packing gland adapter plug 71 is held together by a series of screws 77 which are closely received in aligned openings formed through the plug 71, the outer retainer ring 64, the set 61 of packing rings, the spacer 63, set 60 of packing rings, and blind bores formed in the inner retainer ring 65. The screws 77 have threaded ends which are threaded into the bores in the inner retainer ring 65. The screws 77 are equiangularly spaced around the packing assembly. Accordingly, the packing assembly 47 is assembled as a cartridge prior to installation in the valve body 11 with a predetermined limited number of Belleville springs sleeved about the reduced portion of the outer retainer ring 64. The innermost of the springs 70 engage the annular shoulder of the retainer ring 64 and the outermost is engaged by the inner end of plug 71. The springs are therefore compressed therebetween.

The packing assembly is assembled as a cartridge and held together by the screws 77 so as to facilitate its installation in the valve body. Installation is accomplished by threading the plug 71 into the threaded bore section 46b until its frusto-conical shoulder 75 bottoms against the frusto-conical bore shoulder 51. The shoulder 75 is located such that the end 65a of the retainer ring 65 does not engage the bore shoulder 53 but is slightly spaced therefrom. After being thus installed, the packing assembly is then placed in a desired preloaded condition by uniform tightening of the screws 77 which loads the springs 70 and compresses and expands the packing rings 62 into fluid-tight sealing engagement with the valve body 11 and the valve stem 45. After repeated use and temperature cycling of the valve, there may be some extrusion of the packing ring material which could result in an axial expansion or contraction of the packing assembly and loss of the preload condition. However, the Belleville springs function to avert this possibility by maintaining an axial loading on the assembly.

As best seen in FIG. 2, it will be noted that the packing assembly 47 is depicted as including a plurality of metal chamfer ring 80 which are adapted to prevent extrusion of the packing rings. These rings are triangular in radial cross-section and are arranged as shown in U.S. Pat. No. 4,262,690 wherein pairs of chamfer rings are mounted adjacent each set of packing rings in contact therewith with one set engaging the surface of the valve stem and the other set engaging the wall of bore section 46a. While these rings are not required in this invention they are desirable for use with most types of packing rings. To accommodate the chamfer rings, the inner and outer annular edges of the retainer rings and spacer ring which are adjacent the packing rings must be bevelled to provide camming surfaces whereby the chamfer rings are cammed to expand radially into tight engagement with the valve stem and the bore wall as axial loading is applied to the packing assembly. Accordingly, the chamfer rings operate to prevent extrusion of the packing ring material. If desired, similar chamfer rings may also be placed around the shaft of each screw 77 adjacent both sides of a packing ring set. This arrangement would be desirable for use at very high valve chamber pressures such as 30,000 p.s.i. or more.

It will therefore be seen that when the valve chamber becomes pressurized, fluid pressure will be exerted against the inner retainer ring 65 of the packing assembly 47 and act to further compress the packing rings and the packing assembly. Accordingly, the packing assembly of this invention is pressure energized. Also, due to the presence of the openings formed through the packing rings 62 and the screws therethrough, the surface of the innermost packing ring in the set 61 which is engaged by the retainer ring 65 is less than the surface area of the end of the retainer ring 65 which is exposed to fluid pressure and therefore the force transmitted to the packing rings is an amplification of the fluid pressure which increases the compression and sealing effect of the packing rings. Furthermore, should there be leakage around the innermost set of packing rings, this amplification is not lost in the force transmitted to the innermost packing ring of the second set.

In any event, should there be a packing leak, the loading of the packing assembly and the contact stress of the packing rings can be readily adjusted by means of the screws 77. It is important, of course, that the threaded bores in the inner retainer ring which receives the screws 77 should be of sufficient axial extent that the screws do not bottom out in the preload condition so that loading adjustment can be accommodated.

Also, while two sets of packing rings are disclosed and are preferred, it is to be understood that either a single set or additional sets might be used as well so long as the screw shafts extend through all the packing sets.

Another feature is that the Belleville springs are located outwardly of the packing seal where they are protected from harmful flowline fluids such as hydrogen sulfide. Also, by the unique catridge arrangement of the packing assembly only a fixed minimal number of Belleville springs need be employed and the problems presented by manufacturing tolerances stack-up which would require a larger number of Belleville springs and precise determination thereof are avoided. The cartridge-like assembly also simplifies the installation or removal of the packing assembly from the valve body, and particularly by field service personnel with little risk of error since there need not be any determination or adjustment of the number of Belleville springs.

It is also to be noted that the packing assembly 35 is installed into the bonnet 22 in similar fashion to the manner of installment of the lower packing assembly 47 and the configuration and function of the assemblies are identical.

While the foregoing description of a preferred embodiment of the invention has been presented for purposes of illustration and description, it is not intended that the invention be limited to the precise form disclosed. For example, wave springs or other spring means might be employed in lieu of Belleville springs. The adapter plug ring 71 might be made without any inner facing shoulder such as the shoulder 75. The shoulder 75 prevents an axial insertion of the cartridge to the extent that the cartridge would bottom against the bore shoulder 53 or such that there would be damage to the Belleville springs. In addition, the application of the invention need not be limited to gate valves but is extendable to any type of valve and any application where there is need for sealing around a shaft, it is to be appreciated, therefore, that changes in details of the illustrated construction may be made by those skilled in the art, within the scope of the appended claims, without departing from the spirit of the invention.

What is claimed is:

1. A packing structure for use in a valve having a valve body and a valve element mounted in the body for movement between an open position and a closed position relative to a flow passage through the valve with a valve stem connected to the valve element and extending through a valve stem bore in the valve body and an enlargement of said bore for accommodating a valve stem packing structure therein, said packing structure comprising:

annular packing means including at least one packing ring;

a pair of retainer rings disposed coaxial with said packing means and between which said packing means is located with one of said retainer rings being an inner retainer ring having an inwardly facing annular surface upon which the fluid pressure in the flow passage is disposed to act and the other retainer ring being an outer retainer ring provided with an outward facing external shoulder;

a packing gland adapter ring disposed coaxial with said other rings and in abutting relation with said outer retainer ring, said packing gland adapter ring being provided with external threads for accommodating its connection with an internal threaded section of said valve stem bore;

at least one washer spring of frusto-conical configuration in coaxial sleeved relation about said outer retainer ring with the innermost surface of said washer spring having its inner annular edge in abutting relation with said shoulder of the outer retainer ring and the outermost surface of said washer spring having its outer edge in abutting relation with the inner end of said adapter ring;

said packing means, retainer rings, washer spring and adapter ring being held together in a modular unit by a plurality of screws extending through aligned openings provided in said adapter ring, outer retainer ring and said packing means with the threaded ends of said screws being threadedly received in threaded bores in said inner retainer ring;

said screws being axially adjustable within said threaded bores of the inner retainer ring for applying a predetermined axial loading force on the packing means when the packing structure is installed as a modular unit in the valve stem bore of the valve body whereby the packing means is squeezed against the valve stem and the wall of the valve stem bore to effect a fluid-tight seal thereagainst which is enhanced by further energization of the packing structure by the presence of fluid pressure in the valve.

2. A packing structure as set forth in claim 1 wherein the packing means comprises a plurality of packing rings arranged in a stacked coaxial relationship disposed between said inner and outer retainer rings.

3. A packing structure as set forth in claim 2 wherein the packing structure comprises a plurality of Belleville springs disposed in stacked coaxial sleeved relation about the outer retainer ring with the innermost of the washer springs having its inner annular edge in abutting relation with said shoulder of the outer retainer ring and the outermost of the washer springs having its outer edge in abutting relation with the inner end of said adapter ring.

4. A packing structure as set forth in claim 1 wherein the packing means disposed between the inner and outer retainer rings comprises two sets of packing rings separated by a spacer ring with each set arranged in stacked coaxial relationship.

5. A packing structure as set forth in claim 2 further comprising pairs of anti-extrusion rings disposed at opposite ends of the stack of packing rings to sandwich the packing rings therebetween with one of said pair positioned to engage the valve stem and the other of said pair positioned to engage the wall of the valve stem bore when said packing structure is installed in the valve stem bore, said anti-extrusion rings being formed of a harder substance than said packing rings to impede extrusion of the packing rings along the stem and the wall of the valve stem bore.

6. A packing structure for use in a valve having a valve body and a valve element mounted in the body for movement between an open position and a closed position relative to a flow passage through the valve with a valve stem connected to the valve element and extending through a valve stem bore in the valve body and an enlargement of said bore for accommodating a valve stem packing structure therein, said packing structure comprising:

a plurality of packing rings arranged in stacked coaxial relationship;

a pair of retainer rings disposed coaxial with said packing rings and between which said packing rings are located with one of said retainer rings being an inner retainer ring having an inwardly facing annular surface upon which the fluid pressure in the flow passage is disposed to act and the other retainer ring being an outer retainer ring provided with an outward facing external shoulder;

a packing gland adapter ring disposed coaxial with said other rings and in abutting relation with said outer retainer ring, said packing gland adapter ring being provided with means for accommodating its connection to the valve body in coaxial alignment with the valve stem bore;

spring means disposed between said shoulder of the outer retainer ring and said inner surface of the said packing gland adapter ring in abutting engagement therewith;

said packing rings, retainer rings, spring means and adapter ring being held together in a modular unit by a plurality of screws extending through aligned openings in said adapter ring, outer retainer ring and said packing rings with the threaded ends of the screws being threadedly received in threaded bores in said inner retainer ring;

said screws being axially adjustable within said threaded bores of the inner retainer ring for applying a predetermined axial loading force on said packing rings when the packing structure is installed as a modular unit in the valve stem bore of the valve body whereby the packing rings are squeezed against the valve stem and the wall of the valve stem bore to effect a fluid-tight seal thereagainst, said packing structure being further energized by fluid pressure in the valve.

* * * * *